United States Patent
Masumura et al.

[11] Patent Number: 5,991,554
[45] Date of Patent: Nov. 23, 1999

[54] EXPOSURE APPARATUS FOR MANUFACTURING COLOR CATHODE RAY TUBE

[75] Inventors: Tetsuya Masumura, Kumagaya; Katsumi Omote, Fukaya, both of Japan

[73] Assignee: Kabushiki Kaisha Toshiba, Kawasaki, Japan

[21] Appl. No.: 09/093,715

[22] Filed: Jun. 9, 1998

[30] Foreign Application Priority Data

Jun. 9, 1997 [JP] Japan ..................................... 9-150541

[51] Int. Cl.$^6$ .................................................. G03B 41/00
[52] U.S. Cl. .......................................................... 396/546
[58] Field of Search ............................................ 396/546

[56] References Cited

U.S. PATENT DOCUMENTS 5,023,157  6/1991  Testa ........................................ 396/546
5,270,753  12/1993  Adler et al. ............................. 396/546

FOREIGN PATENT DOCUMENTS 1-319225  12/1989  Japan .
7-312172  11/1995  Japan .

Primary Examiner—Russell Adams
Attorney, Agent, or Firm—Oblon, Spivak, McClelland, Maier & Neustadt, P.C.

[57] ABSTRACT

An exposure apparatus for exposing a phosphor screen of a cathode ray tube includes a light source portion having an elongate light source lamp and a shading member arranged to face the lamp. The shading member is formed with a slit through which a light beam from the lamp passes. The slit is formed in a V-shaped configuration in which it protrudes toward the light source lamp. The shading member is formed such that a cross section thereof in the direction in parallel to the axis of the light source lamp has a wedge-like shape in which the thickness increases from the edge of the slit toward the end thereof in the direction of the axis, and such that a cross section in a direction perpendicular to the axis has a uniform thickness at the position of the slit.

6 Claims, 2 Drawing Sheets

EXPOSURE APPARATUS FOR MANUFACTURING COLOR CATHODE RAY TUBE

BACKGROUND OF THE INVENTION

The present invention relates to an exposure apparatus used for forming the phosphor screen of a color cathode ray tube.

The formation of a phosphor screen on an inner surface of a face panel during the manufacture of a color cathode ray tube includes a step of exposing a photosensitive resin film formed on the inner surface of the face panel in accordance with patterns of red, green and blue phosphor dots. Normally, a light absorbing layer, referred to as "black matrix", having phosphor dot forming regions in the form of holes is formed on the inner surface of the face panel and, thereafter, phosphor dots in three colors are formed on the dot forming regions. An exposure apparatus as described below is used to form such patterned black matrix and phosphor dots.

Specifically, the exposure apparatus comprises a lamp house including an extra-high voltage long arc mercury lamp serving as an exposure lamp, an optical lens arranged to oppose to the lamp house, and a light distribution filter arranged to oppose to the optical lens. An exposure beam emitted from the mercury lamp is refracted by the optical lens to be corrected such that its optical path coincides with the path of electron beams and is then transmitted by the light distribution filter to be projected upon the inner surface of the face panel through apertures of a shadow mask. As a result, a photosensitive phosphor surface film coated on the inner surface of the face panel is printed in correspondence with the aperture pattern of the shadow mask. The light distribution filter is a glass filter formed with a deposition film in a predetermined pattern on the surface thereof and corrects illumination distribution on the inner surface of the face panel.

The lamp house includes a window glass as a light-transmitting window provided at an upper portion (on the face panel side) thereof, and a straight tube type long arc mercury lamp is arranged in the lamp house. The lamp house has a structure in which cooling water is circulated to cool the mercury lamp. Further, a shading plate having a V-shaped slit is arranged above the lamp in the lamp house at a predetermined interval therefrom. In this case, the shading plate is arranged such that the longitudinal direction of the lamp is perpendicular to the longitudinal direction of the slit. The shading plate is secured to the lamp house by mating a slit locating hole thereof with a locating protrusion on the lamp house and by urging it using an O-ring and a locking ring with the window glass arranged above the V-shaped slit in a face-to-face relationship therewith.

A conventional shading plate is formed by using, for example, a darkened thin iron plate with a thickness in the range of 0.1 to 0.3 mm and by bending the region of the iron plate including the slit into a V-like configuration using a press process. The configuration of the V-shaped slit varies depending on the color cathode ray tube in which it is used. The bending angle defined by the two sides of the character V is normally within the range of 80 to 180°; the length of the slit (the length of one of the sides of the character V) is within the range of 3 to 10 mm; and the width of the slit is within the range of 0.5 to 2.5 mm.

In the exposure apparatus having a lamp house in the configuration as described above, an exposure beam emitted from the exposure lamp passes through the V-shaped slit and thereafter exposes the photosensitive phosphor surface film on the panel inner surface through the apertures in the shadow mask. The position in the V-shaped slit where exposure beam passes through is the apparent position of the light source.

In such an exposure apparatus utilizing a lamp house which is formed in resemblance to a point light source by providing a shading plate bend in a V-like configuration in a face-to-face relationship with a straight tube type light source lamp, the directivity of the exposure beam emitted from the exposure lamp significantly varies depending on the distance between the exposure lamp and a V-shaped bottom portion of the shading plate and the bending angle of the shading plate.

Although the interior of the lamp house is in general cooled by cooling water, the shading plate is unavoidably heated by radiant heat because a high-output mercury lamp is used as the exposure lamp. Meanwhile, since the shading plate is formed by bending a thin plate, it has low mechanical strength and is therefore subjected to deformation attributable to thermal expansion due to heat generated by emission from the lamp for a long time. The deformation of the shading plate, i.e., changes in the angle and height of the V-shaped slit causes a change in the positional relationship between the exposure lamp and the slit and in a change in the angle of incidence of the exposure beam upon the shadow mask. When the phosphor screen is manufactured in such a state, the photosensitive phosphor surface film is exposed in positions shifted from predetermined positions, and this causes poor exposure of the phosphor surface.

Further, since the shading plate is secured by mating the locating protrusion provided on the inner wall of the lamp house with the locating hole of the shading plate, misalignment is likely to occur. In the case of misalignment of the shading plate, poor exposure of the phosphor surface occurs again as in the case described above.

BRIEF SUMMARY OF THE INVENTION

The present invention has been contrived in consideration of the above-described circumstances, and its object is to provide an exposure apparatus in which thermal deformation and misalignment of a light source portion is prevented to make it possible to produce color cathode ray tubes having a high quality phosphor surface consistently.

In order to achieve the object, an exposure apparatus according to the present invention comprises an elongate light source having an axis, a plate-shaped member arranged to oppose the light source and having a slit that transmits light beams from the light source, a light transmitting window arranged to oppose the shading member, and a lamp house supporting the light source, shading member and light transmitting window.

The slit of the shading member extends in a direction perpendicular to the axis of the light source and has a V-shaped configuration such that it protrudes toward the light source.

The shading member has a configuration in which the cross section thereof in the direction perpendicular to the axis of the light source has a uniform thickness in the position of the slit and in which a sectional shape thereof in the direction in parallel with the axis of the light source has a wedge shape wherein a thickness increases from the opening edge of the slit toward the end thereof in the direction of the axis.

In order to obtain the sectional shape of the shading member described above, a recess substantially in the form of a quadrangular pyramid is formed on that surface of the shading member which opposes to the light-transmitting window, and the slit is formed along the V-shaped edge line of the recess.

Further, the lamp house of the exposure apparatus according to the invention includes a stage on which the shading member is secured, and the shading member is secured with the sides and the bottom thereof being in contact with the stage.

In the exposure apparatus having the above-described configuration, the shading member can be made thick in regions thereof other than the slit by forming it into the sectional shape described above, thereby making its mechanical strength higher than that of a conventional shading plate obtained by bending a thin plate formed with a slit. Therefore, even when the shading member is heated by heat generated by the light source, thermal deformation of the shading member can be reduced to keep the position of the slit stable. The term "thick" used here means that the member has a sufficient thickness that allows the substantially V-shaped slit to be formed without bending the member.

Further, the exposure apparatus has a structure in which the possibility of misalignment of the shading member is reduced because it is secured with the sides and bottom thereof being in contact with the stage.

In addition, since recesses engaged with the light source are formed in the shading member and the stage, the misalignment of the light source relative to the slit can be avoided.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1 through 6 show an exposure apparatus according to an embodiment of the invention; in which:

FIG. 1 is a sectional view showing the exposure apparatus as a whole;

FIG. 3 is a perspective view showing a shading member in the light source portion;

FIG. 4 is a sectional view taken along the line III—III in FIG. 3;

FIG. 5 is a sectional view taken along the line IV—IV in FIG. 3; and

FIG. 6 is a sectional view showing a stage in the light source portion.

DETAILED DESCRIPTION OF THE PREFERRED EMBODIMENT

An exposure apparatus for a color cathode ray tube, according to an embodiment of the invention will now be described in detail with reference to the accompanying drawings.

Figure 1:
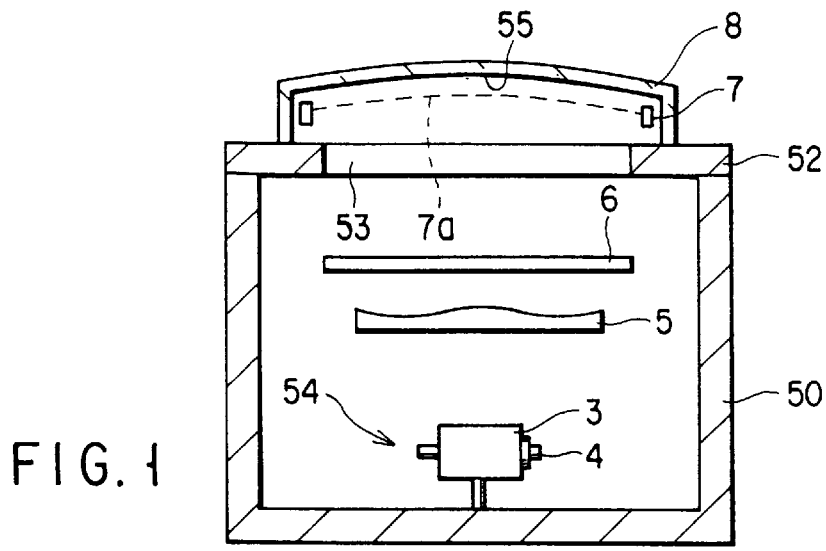

As shown in FIG. 1, the exposure apparatus includes a housing 50 substantially in the form of a rectangular box. A rectangular opening 53 is formed in a top plate 52 of the housing 50. The top plate 52 serves as a support plate on which a face panel 8 of a cathode ray tube is to be placed. Specifically, during an exposure operation, the face panel 8 is placed on the top plate 52 to face the opening 53. A photosensitive phosphor surface film 55 is coated on the inner surface of the face panel 8, and a shadow mask 7 is arranged to oppose the inner surface of the face panel.

A light source portion 54 including an extra-high voltage long arc mercury lamp 4 as a light source is mounted on the inner bottom of the housing 50, and an optical lens 5 and a light distribution filter 6 are arranged in this order between the light source portion 54 and the opening 53.

An exposure beam emitted from the mercury lamp 4 is refracted by the optical lens 5 to be corrected such that its optical path coincides with the path of an electron beam, transmitted by the light filter 6 and thereafter projected upon the inner surface of the face panel 8 through apertures 7a of the shadow mask 7. As a result, the photosensitive phosphor surface film 55 coated on the inner surface of the face panel 8 is exposed and printed in accordance with the aperture pattern of the shadow mask 7. The light distribution filter 6 is constituted by a glass filter formed with a deposition film in a predetermined pattern on the surface thereof and corrects illumination distribution of the exposure beam projected upon the inner surface of the face panel 8.

Figure 2A:
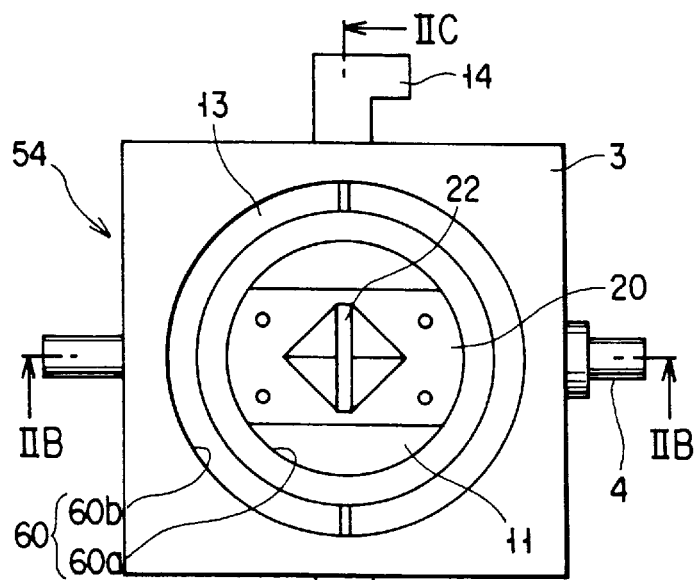
FIG. 2A is a plan view showing a light source portion of the exposure apparatus.
Figure 2C:
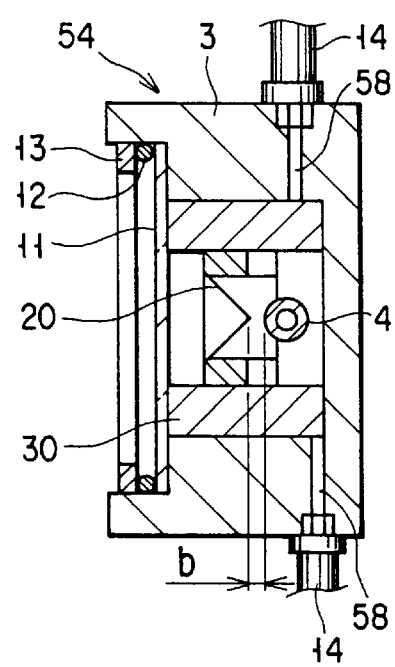
FIG. 2C is a sectional view taken along the line IIC—IIC in FIG. 2A.
Figure 2B:
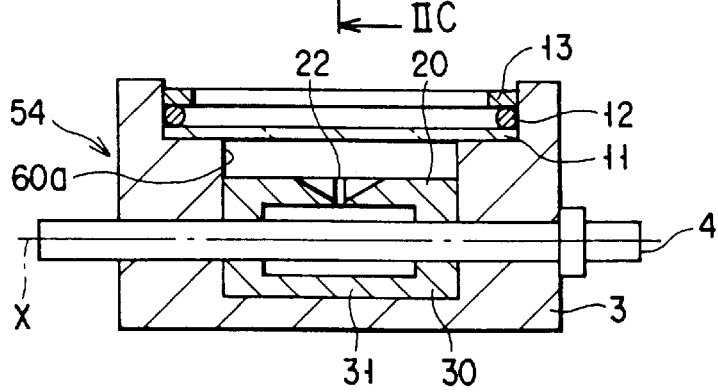
FIG. 2B is a sectional view taken along the line IIB—IIB in FIG. 2A.
Figure 3:
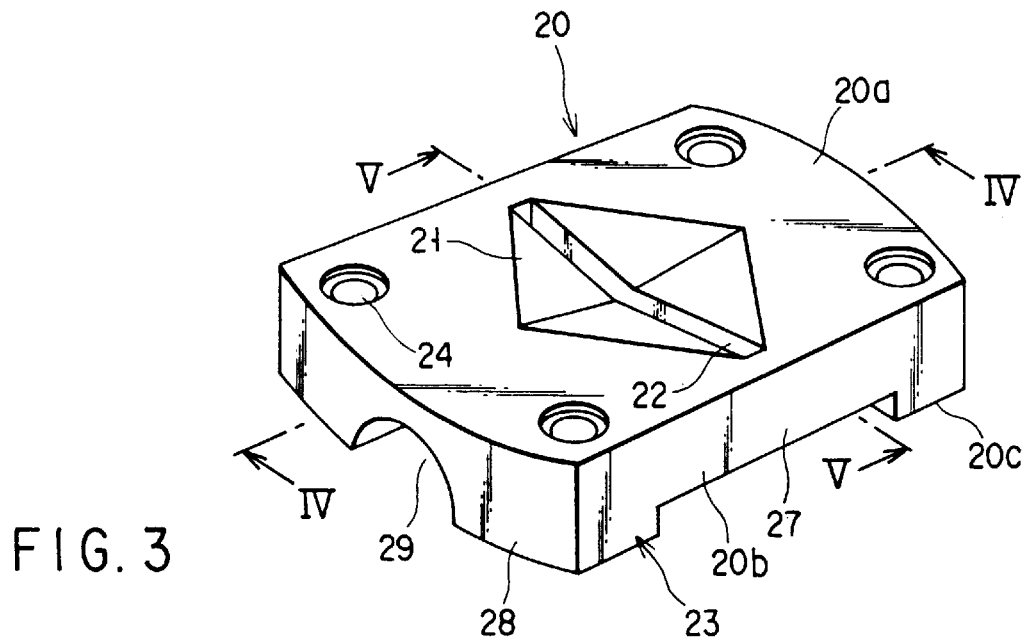

As shown in FIGS. 2A, 2B and 2C, the light source portion 54 includes a lamp house 3 in the form of a rectangular block. A window glass 11 as a light-transmitting window is provided at an upper part (on the face panel side) of the and the lamp house 3, and a straight tube type long arc mercury lamp 4 is securely arranged in the lamp house. The lamp house 3 has a structure in which cooling water is circulated to cool the mercury lamp 4.

Specifically, the lamp house 3 is formed with a stepped hole 60 having a closed-end, and a cylindrical stage 30 and a shading member 20 to be described later are fitted into a smaller diameter portion 60a of the stepped hole 60. The disk-shaped window glass 11 is fitted in a larger diameter portion 60b of the stepped hole 60 and is secured to the lamp house 3 by using an O-ring 12 and a locking ring 13.

The lamp house 3 and stage 30 have a space into which the mercury lamp 4 is inserted, and the mercury lamp 4 is arranged so as to penetrate the stage 30 from the outside. Further, the lamp house 3 is formed with a channel 58 for circulating cooling water for cooling the lamp 4, and a cooling water penstocks 14 are connected to the channel.

As shown in FIGS. 2A through 4, the shading member 20 is formed by cutting a thick (e.g., 1 to 7 mm) rectangular plate material. The shading member 20 has a rectangular flat upper surface 20a, and a slit formation portion 21, which is a recess substantially in the form of a quadrangular pyramid, is formed in the central portion of the upper surface. The periphery of the shading member 20 is formed thicker to define a rectangular frame portion 23 which surrounds the slit formation portion 21.

A slit 22 having a constant width is formed along that edge line of the recess defining the slit formation portion 21 which extends in a direction perpendicular to an axis X of the mercury lamp 4. Four corners of the shading member 20 are formed with through holes 24 through which fixing screws are inserted and which are located such that they surround the slit formation portion 21.

Figure 4:
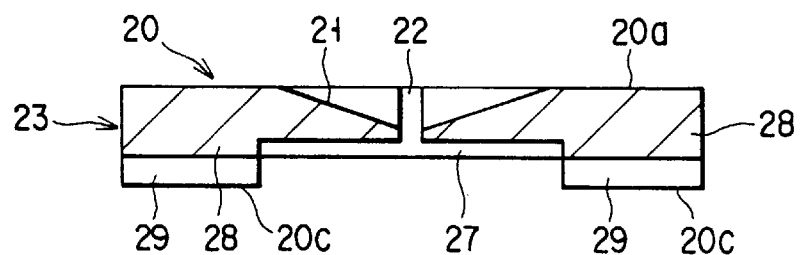
Figure 5:
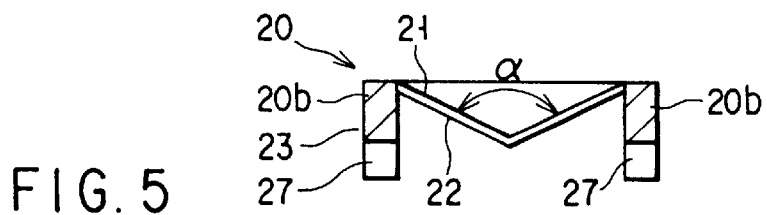
Figure 6:
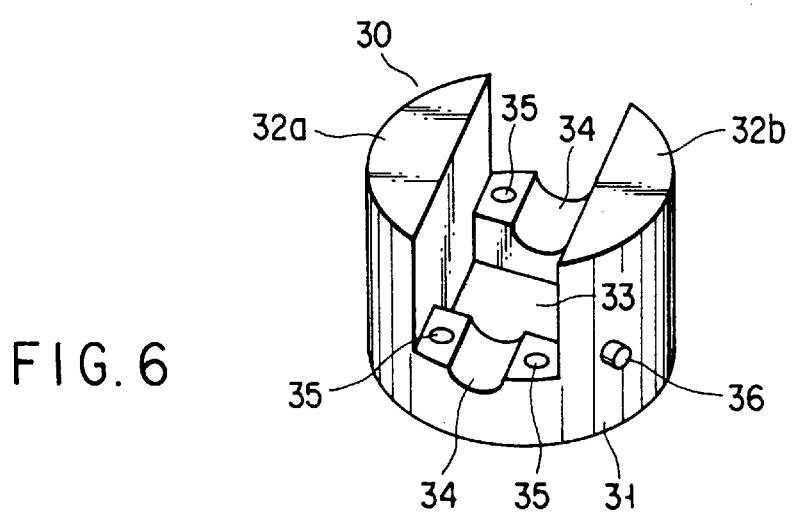

As shown in FIG. 4, a cross section of the slit formation portion 21 of the shading member 20 in the direction of the axis X is formed in a wedge-like configuration in which the thickness increases from the opening edge of the slit 22 toward the end of the shading member in the direction of the axis X, and the periphery of the slit formation 21 is contiguous with the thick frame portion 23. Further, as shown in FIG. 5, the slit formation portion 21 is formed such that the transverse section thereof in the direction perpendicular to the axis of the light source has a uniform thickness and defines a V-shaped slit 22 in the position of the slit 22. Both ends of the transverse section extend from the respective ends of the slit 22 to the thick frame portion 23.

An angle a defined by the two sides of the slit 22 in the form of the character V is set within the range of 80 to 180°; the length of the slit (the length of one of the sides of the character V) is set within the range of 3 to 15 mm; and the width of the slit is set within the range of 0.5 to 2.5 mm.

Further, in the slit formation portion 22, those regions between the sections shown in FIGS. 4 and 5 are formed with a concave in an appropriate shape on the side facing the mercury lamp 4 such that the slit 22 is formed in three dimensions.

The frame portion 23 includes a pair of first walls 27 extending in parallel with the axis X of the mercury lamp 4, and a pair of second walls 28 extending in the direction perpendicular to the axis X and having a thickness larger than that of the first walls 27. The first walls 27 increases the strength of the ends of the shading member 20 in the direction perpendicular to the axis X.

Each of the second walls 28 includes a substantially semi-circular recess 29 which engage the mercury lamp 4. The mercury lamp 4 is inserted in and held by a cylindrical space defined by those recesses 29 and recesses provided on a stage 30 to be described later.

The height of the first walls 27 is smaller than that of the second walls 28 excluding the recesses 29. The purpose for this is to allow cooling water to flow through gaps defined between the first walls 27 and the stage 30.

For example, the shading member 20 having the above-described configuration can be formed by using a discharge cutting process.

A description will now be made on the cylindrical stage 30 on which the shading member 20 is placed. As shown in FIGS. 2A, 2B, 2C and 6, the stage 30 is formed in a cylindrical configuration having a diameter substantially equal to that of the small diameter portion 60a of the stepped end hole 60 formed in the lamp house 3. The stage 30 is cut in a width substantially equal to that of the shading member 20 in the middle thereof and is in a configuration wherein two upright walls 32a and 32b opposing to each other are erected on a bottom wall 31 in the form of a disk. The bottom wall 31 is formed with an opening 33 in the middle thereof and a pair of semi-circular recesses 34 and four threaded holes 35 in regions excluding the opening 33. The semi-circular recesses 34 are coaxially aligned with each other with the opening 33 being interposed between the recesses 34. A protrusion 36 is provided on the outer circumferential surface of the stage 30 for locating the stage when it is mounted in the lamp house 3.

The stage 30 is fitted into the smaller diameter portion 60a of the lamp house 3 and is positioned such that the recesses 34 are aligned along the axis X of the mercury lamp 4. After the mercury lamp 4 is mounted, the shading member 20 is fitted into the space defined between the upright walls 32a and 32b of the stage 30 and is secured to the bottom wall 31 with four screws which are not shown. At this time, the shading member 20 is in surface contact with the stage 30 on both sides 20b and bottom 20c thereof. When the shading member 20 is fitted, the recesses 29 on the bottom of the shading member and the recesses 34 on the stage 30 are positioned in a face-to-face relationship with each other to define cylindrical spaces. The mercury lamp 4 is held in the lamp house 3 with being fitted in those spaces.

Thus, the slit 22 of the shading member 20 is arranged so as to protrude toward the mercury lamp 4. At the same time, the slit 22 faces the mercury lamp 4 with a predetermined gap b therebetween and extends in the direction perpendicular to the axis X of the lamp 4. By fitting the window glass 11 into the larger diameter portion 60b of the lamp house 3 and securing it with the O-ring 12 and locking ring 13, the window glass 11 closes an opening at the upper end of the smaller diameter portion 60a and is held with opposing the shading member 20. The mercury lamp 4 is positioned relative to the shading member 20 by engaging with the recess 29.

An exposure light beam emitted from the mercury lamp 4 impinges upon the optical lens 5 through the slit 22 and travels through the light distribution filter 6 and the shadow mask 7 to expose the photosensitive phosphor surface film 55.

In the exposure apparatus configured as described above, the shading member 20 of the light source portion 54 is heated by radiant heat from the mercury lamp 4 when the exposure operation lasts for a long time. However, the shading member 20 is formed such that the cross section of the slit formation portion 21 in the direction of the axis X has a thickness which gradually increases from the slit 22 toward the end thereof in the direction of the axis, and the thick frame portion 23 is formed around and integrally with the slit formation portion. Thus, the mechanical strength of the shading member 20 can be improved at the slit formation portion 21 compared to the prior art, thereby reducing thermal deformation thereof significantly. Further, since the shading member 20 is secured to the stage 30 with the bottom and both sides thereof in surface contact with the stage 30, the misalignment of the shading member is avoided to improve the positioning accuracy of the shading member.

As a result, an exposure operation can be performed with the slit 22 of the shading member 20 and the mercury lamp 4 being kept in a constant positional relationship, thereby exposing the sensitive phosphor surface film 55 in a predetermined pattern. Therefore, the use of the above-described exposure apparatus makes it possible to manufacture color cathode ray tubes with consistent quality.

The present invention is not limited to the above-described embodiment, and various modifications can be made within the scope of the invention. For example, although the shading member is formed by using a discharge cutting process in the above description, the method for forming the slit in three dimensions is not limited thereto and various methods may be used.

Although the stage for placing the shading member is a removable cylindrical stage in the above description, a stage portion having a surface that contacts the shading member may be formed in the lamp house.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. An exposure apparatus for exposing a phosphor screen of a color cathode ray tube, comprising:

an elongate light source having an axis;

a plate-shaped shading member arranged to face the light source and having a slit through which a light beam from the light source passes;

a light-transmitting window arranged to oppose the shading member; and a lamp house supporting the light source, shading member and light-transmitting window;

the slit of the shading member extending in a direction substantially perpendicular to the axis of the light source and having a V-shaped configuration in which the slit protrudes toward the light source, and the shading member having a configuration wherein a cross section in a direction perpendicular to the axis of the light source has a uniform thickness at the position of the slit and a cross section in a direction in parallel to the axis of the light source has a wedge-like shape in which a thickness gradually increases from an edge of the slit toward the end of the shading member in the direction of the axis of the light source.

2. An exposure apparatus according to claim 1, wherein the shading member is formed in a substantially plate-like configuration and includes a recess substantially in the form of a quadrangular pyramid formed on a surface of the shading member facing the light-transmitting window, and the slit is formed along an edge line of the recess extending perpendicular to the axis of the light source.

3. An exposure apparatus according to claim 2, wherein the shading member includes a frame portion integral therewith, the frame portion extending along a periphery of the shading member and surrounding the recess.

4. An exposure apparatus according to claim 3, wherein the frame portion includes a pair of first walls extending in a direction parallel to the axis of the light source and a pair of second walls extending in a direction perpendicular to the axis and having a thickness larger than that of the first walls, and each of the second walls includes a recess which engages the light source.

5. An exposure apparatus according to claim 1, wherein the lamp house includes a stage on which the shading member is secured, and the shading member includes sides and a bottom in contact with the stage.

6. An exposure apparatus according to claim 1, which further comprises:

a housing containing the lamp house, the housing having an opening opposing the lamp house and a support portion on which a face panel of a cathode ray tube is placed;

an optical lens arranged between the opening and the lamp house in the housing, for correcting a path of the light beam which has passed through the slit; and a light distribution filter arranged between the optical lens and the opening in the housing, for correcting illumination distribution of the light beam, which has passed through the optical lens, on the face panel.

* * * * *